(12) United States Patent
Chan et al.

(10) Patent No.: US 10,684,995 B2
(45) Date of Patent: *Jun. 16, 2020

(54) STORAGE OPTIMIZATION IN COMPUTING DEVICES

(71) Applicant: RAZER (ASIA-PACIFIC) PTE. LTD., Singapore (SG)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,022

(22) Filed: Nov. 28, 2017

(65) Prior Publication Data

US 2018/0081649 A1  Mar. 22, 2018

Related U.S. Application Data

(63) Continuation of application No. 14/222,337, filed on Mar. 21, 2014, now Pat. No. 9,836,287.

(Continued)

(51) Int. Cl.
*G06F 12/06* (2006.01)
*G06K 9/00* (2006.01)
(Continued)

(52) U.S. Cl.
CPC ............ *G06F 16/178* (2019.01); *G06F 8/44* (2013.01); *G06F 9/54* (2013.01); *G06F 11/1464* (2013.01); *G06F 16/113* (2019.01); *G06F 16/116* (2019.01); *G06F 16/122* (2019.01); *G06F 16/16* (2019.01); *G06F 16/168* (2019.01); *G06F 16/1734* (2019.01); *G06F 16/1787* (2019.01); *G06F 16/182* (2019.01); *G06F 16/24578* (2019.01); *G06F 16/27* (2019.01); *H04L 41/0816* (2013.01); *H04L 47/70* (2013.01);
(Continued)

(58) Field of Classification Search
CPC ............ G06F 12/121; G06F 17/30082; G06F 17/30905; G06K 9/00288
See application file for complete search history.

(56) References Cited

U.S. PATENT DOCUMENTS 8,499,088 B1  7/2013  Breau
9,070,182 B1  6/2015  Chua
(Continued)

*Primary Examiner* — Nicholas R Taylor
*Assistant Examiner* — Ho T Shiu
(74) *Attorney, Agent, or Firm* — Mattingly & Malur, PC

(57) ABSTRACT

Some examples include one or more processors that optimize the storage capacity of a computing device of a user. For instance, the one or more processors may receive, from the computing device, an indication of a request to download a data file. In addition, the one or more processors may determine a device classification associated with the computing device and a user access pattern associated with the data file. Further, the one or more processors may perform a downsampling of the data file based on the device classification and the user access pattern in response to the request, and may transmit the downsampled data file to the computing device.

19 Claims, 7 Drawing Sheets

Related U.S. Application Data

(60) Provisional application No. 61/804,134, filed on Mar. 21, 2013.

(51) Int. Cl.

| | | |
|---|---|---|
| *G06K 9/46* | (2006.01) | |
| *G06T 3/00* | (2006.01) | |
| *G06F 16/178* | (2019.01) | |
| *G06F 9/54* | (2006.01) | |
| *G06F 16/16* | (2019.01) | |
| *G06F 16/27* | (2019.01) | |
| *G06F 16/11* | (2019.01) | |
| *G06F 16/182* | (2019.01) | |
| *G06F 16/17* | (2019.01) | |
| *G06F 16/2457* | (2019.01) | |
| *H04L 29/08* | (2006.01) | |
| *G06F 11/14* | (2006.01) | |
| *H04L 12/24* | (2006.01) | |
| *H04L 12/911* | (2013.01) | |
| *H04L 29/06* | (2006.01) | |
| *H04W 12/06* | (2009.01) | |
| *G06F 8/41* | (2018.01) | |

(52) U.S. Cl.
 CPC .......... *H04L 47/78* (2013.01); *H04L 63/0853* (2013.01); *H04L 67/06* (2013.01); *H04L 67/10* (2013.01); *H04L 67/1095* (2013.01); *H04L 67/1097* (2013.01); *H04L 67/22* (2013.01); *H04L 67/306* (2013.01); *H04L 69/04* (2013.01); *H04W 12/06* (2013.01); *G06F 11/1451* (2013.01); *G06F 11/1469* (2013.01)

(56) References Cited

U.S. PATENT DOCUMENTS

| | | | |
|---|---|---|---|
| 9,448,961 B1 | 9/2016 | Cohen | |
| 2003/0093790 A1 | 5/2003 | Logan et al. | |
| 2006/0184410 A1 | 8/2006 | Ramamurthy et al. | |
| 2007/0226365 A1* | 9/2007 | Hildreth | G11B 27/034 709/231 |
| 2008/0140941 A1* | 6/2008 | Dasgupta | G11B 27/034 711/137 |
| 2009/0024664 A1 | 1/2009 | Benbunan Garzon | |
| 2009/0112949 A1* | 4/2009 | Ergan | G06F 12/0802 |
| 2010/0042655 A1 | 2/2010 | Tse | |
| 2011/0119716 A1 | 5/2011 | Coleman, Sr. | |
| 2011/0310105 A1* | 12/2011 | Koneru | G06F 3/14 345/501 |
| 2012/0215639 A1 | 8/2012 | Ramer et al. | |
| 2013/0104251 A1 | 4/2013 | Moore et al. | |
| 2013/0339605 A1 | 12/2013 | Factor et al. | |
| 2014/0006950 A1 | 1/2014 | Chetlur | |
| 2014/0067824 A1* | 3/2014 | DeLuca | G06F 16/2255 707/747 |
| 2014/0136792 A1 | 5/2014 | Frachtenberg | |
| 2014/0237201 A1 | 8/2014 | Swift | |
| 2014/0244937 A1* | 8/2014 | Bloomstein | H04L 29/08801 711/136 |
| 2015/0195221 A1 | 7/2015 | Rasmussen | |

* cited by examiner

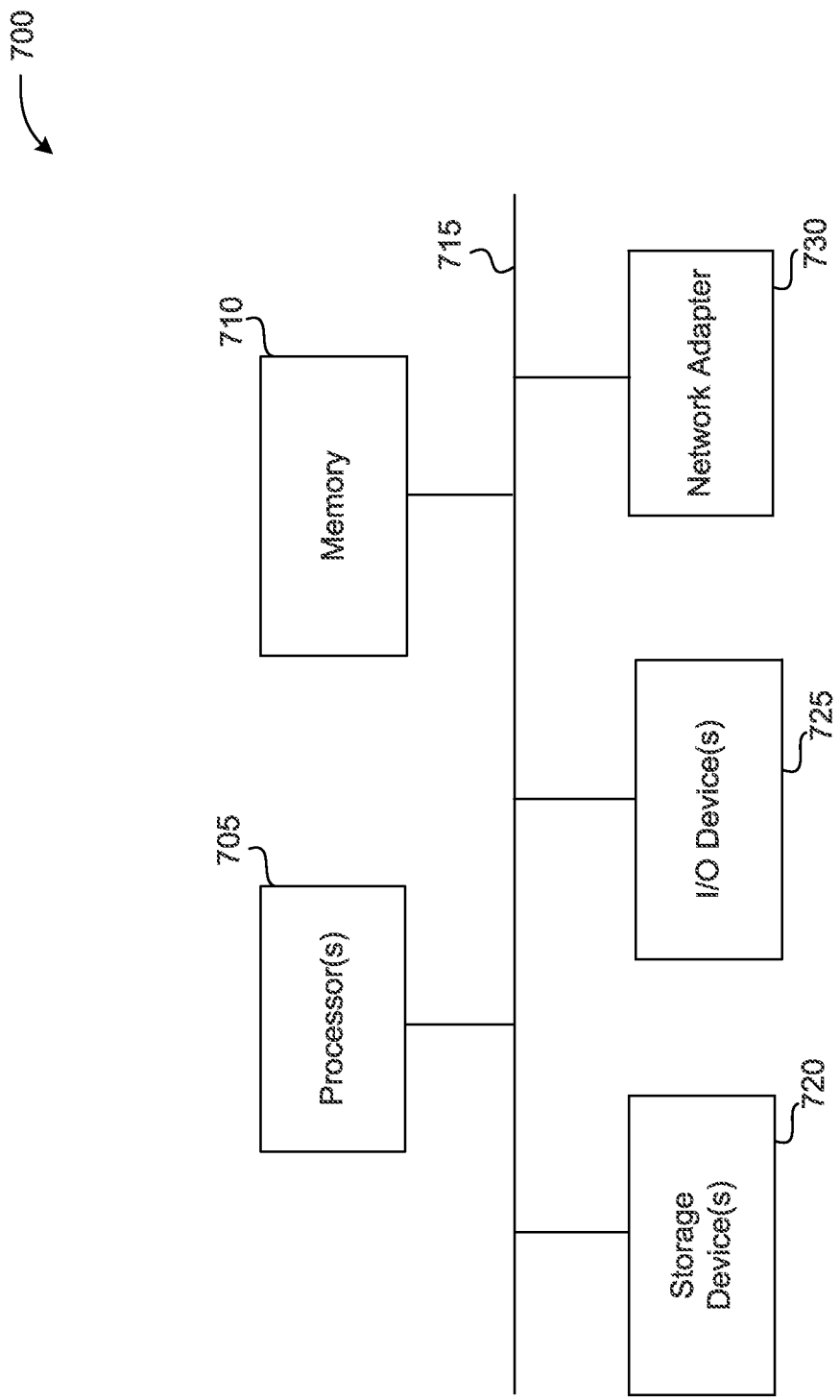

STORAGE OPTIMIZATION IN COMPUTING DEVICES

CROSS-REFERENCES TO RELATED APPLICATIONS

This application is a continuation of U.S. patent application Ser. No. 14/222,337, entitled "STORAGE OPTIMIZATION IN COMPUTING DEVICES", which was filed Mar. 21, 2014, which claims to the benefit of U.S. Provisional Patent Application No. 61/804,134, entitled "OPERATING SYSTEM AND DEVICE INTEGRATED WITH CLOUD COMPUTING FUNCTIONALITIES," which was filed on Mar. 21, 2013, which are incorporated by reference herein in their entireties.

FIELD OF THE INVENTION

At least one embodiment of the present invention relates to storage system, and more particularly to computing device optimizing local storage by use of data downsampling and compression.

BACKGROUND

Today, consumers are able to consume rich content available over the Internet, whenever and wherever, due to the advent of personal computing devices, such as mobile devices. For example, a user can access a mobile game application, at a mobile device of the user (e.g., a smartphone or a tablet), by connecting to a cloud storage system and downloading the application onto a local cache of the mobile device. A user can download as much content as the user desires, as long as the personal computing device has the necessary storage space.

As computing devices are typically limited in storage capacity, a user may find that there is not enough storage space on a device's local cache to accommodate downloading. Rich multimedia content, such as a typical mobile game application, can include a large amount of data having a size of several gigabytes (GBs). As such, the user may have to delete existing applications or files stored on the mobile device in order to access the application. The user has to decide which existing applications and/or files are important in making such deletions. Accordingly, accessing content of various sources over the Internet becomes burdensome as it requires the user to manage manually local storage space on a frequent basis.

BRIEF DESCRIPTION OF THE DRAWINGS

FIG. 7 is a block diagram illustrating components of a computer system that can perform various operations described by the disclosed technology.

DETAILED DESCRIPTION

Figure 1:
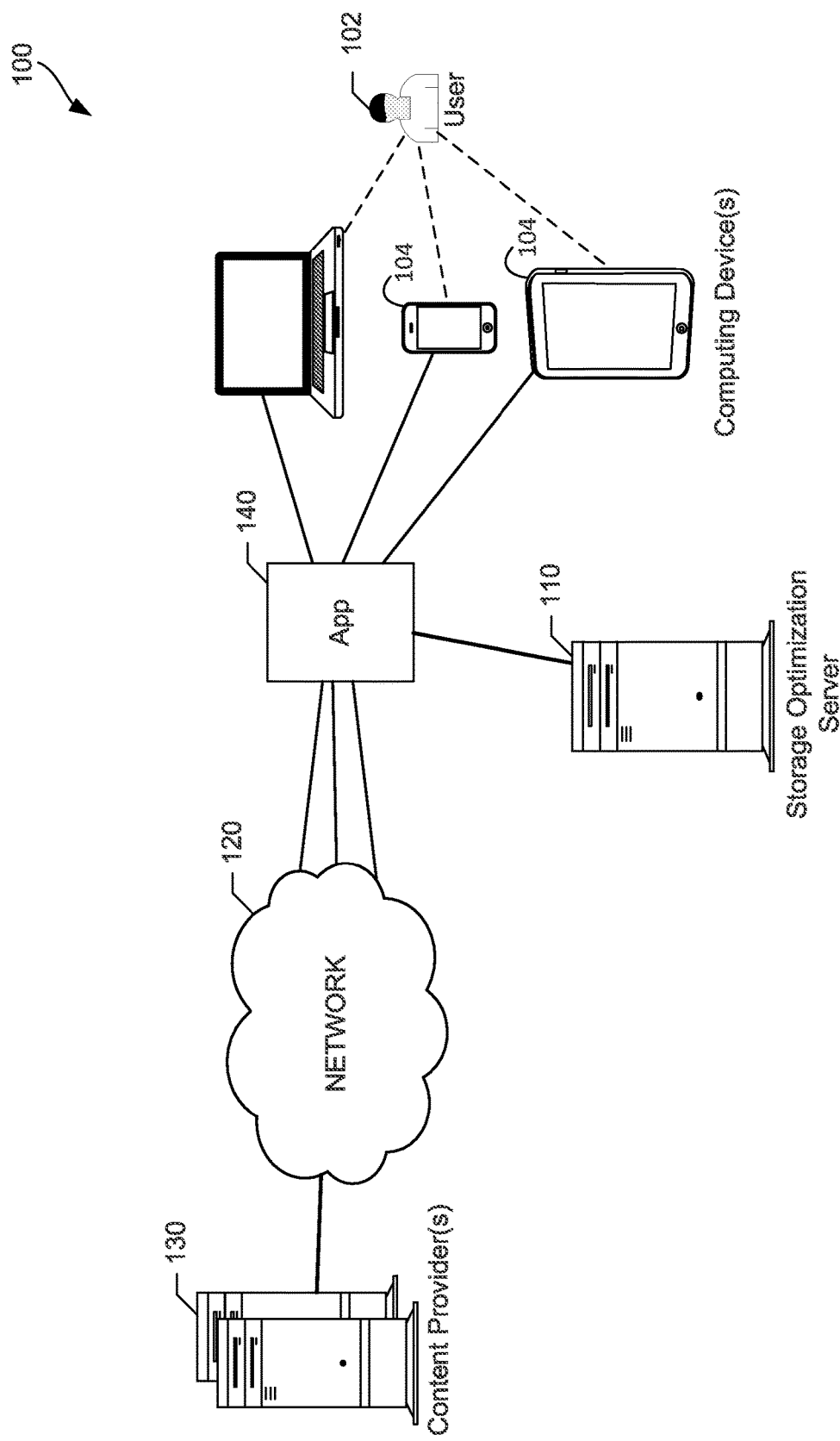
FIG. 1 illustrates an environment in which the storage optimization technology can be implemented, in accordance with various embodiments.

References in this description to "an embodiment," "one embodiment," or the like, mean that the particular feature, function, structure or characteristic being described is included in at least one embodiment of the present invention. Occurrences of such phrases in this description do not necessarily all refer to the same embodiment. On the other hand, the embodiments referred to also are not necessarily mutually exclusive.

Introduced here is a technology that optimizes local data storage of a computing device by use of downsampling and data compression ("the storage optimization technology"). According to the technology introduced, methods, systems, and machine-readable storage mediums are provided for selectively downsampling and compressing files downloaded and/or stored in a computing device. In at least some embodiments, a method includes monitoring access patterns in association with data of one or more files accessed by a user of the computing device ("user access patterns"), determining a classification of the computing device ("device classification" or "device type"), and utilizing the user access patterns and the device classification in deciding when to downsample and/or compress the one or more files. In particular, a storage optimization policy can specify downsampling, lossy compression, lossless compression, or a combination thereof to be applied to the one or more files based on thresholds associated with the user access patterns and/or the device classification. Utilization of the storage optimization policy can enable the computing device to have an infinite local storage capacity.

In some embodiments, the storage optimization policy is applied when a download of the one or more files to the device takes place. In such embodiments, downsampling can be performed on the one or more files based on the user access patterns associated with those files. In some embodiments, the downsampling can be performed based on the device classification. For instance, where the user accesses a web photo gallery using an IPHONE®, image files of the gallery may be downsampled from an IPAD® resolution to an IPHONE® resolution for download to the device, in accordance with the storage optimization policy as the higher IPAD® resolution is not necessary for viewing on the IPHONE®. Ultimately, the amount of data of the downloaded files is reduced, saving storage space on the computing device. In some embodiments, the amount of data of the downloaded files is further reduced by use of data compression based on the storage optimization policy. In such embodiments, the files being downloaded are selectively downsampled and compressed for storage on the device.

In some embodiments, the storage optimization policy is applied to reduce data of one or more files already in storage at the device by use of data compression. In some embodiments, data compression can be performed based on the device classification. In some embodiments, data compression can be performed based on user access patterns associated with the files. Data compression can include a lossy compression method and a lossless compression method. The storage optimization policy can specify which compression method is optimal for compressing the data based on the user access patterns. For instance, based on the storage optimization policy, a lossless compression of certain data of a gaming application is performed when access patterns of the user reflects that the data will not likely be used in the near future. In such instance, the lossless compression saves current storage space, yet still provides the user a chance to decompress the data for use at some point in time.

Other aspects of the technology introduced here will be apparent from the accompanying figures and the following description.

FIG. 1 illustrates an example system environment 100 in which the storage optimization technology can be implemented in accordance with various embodiments. The environment 100 includes a computing device 104 of a user 102, a storage optimization server 110, a network 120, and one or more content providers 130. The computing device 104, the server 110, and the content providers 130 are coupled in communication for data transmission over the network 120.

In some embodiments, the network 120 can be wireless (e.g., which may include an IEEE 802.11 wireless network, or a data traffic network based on wireless telephony services such as 3G, 3.5G, 4G LTE and the like). In some embodiments, the network 120 can be a wired network. The technologies supporting the communications between the computing device 104, the server 110, and the content providers 130 can include Ethernet (e.g., as described in IEEE 802.3 family of standards) and/or other suitable types of area network technologies. One of ordinary skill in the art will understand that the components of FIG. 1 are just one implementation of the computer network environment within which present embodiments may be implemented, and the various alternative embodiments are within the scope of the present embodiments. For example, the network 120 may include intervening devices (e.g., switches, routers, hubs, etc.) in the network 120. In some examples, the network 120 comprises the Internet.

The computing device 104 can be used by the user 102 to communicate with the content providers 130 in accessing various content (e.g., through websites hosted by the content providers). The computing device 104 can include a laptop, a desktop, a personal computer, a personal digital assistant ("PDA"), a computing tablet, a smart phone, and the like. For example, the user 102 uses a web browsing application, running on an operating system of a laptop, to visit a website hosted by a content provider 130. During such visit, the user 102 can view, or access, multimedia content (e.g., images, videos, etc.) on each webpage of the website using the web browsing application. The multimedia content is typically downloaded to a data storage device of the laptop, such as a local cache storage or any other form of data storage (e.g., a remote storage device).

The computing device 104 can execute an application 140 for optimizing storage capacity of the device 104. The application 140 can be a user interfacing application (e.g., a mobile application, a browser application, a desktop application, etc.), or a background process in support of a user interfacing application. In the illustrated example of FIG. 1, the application 140 is a storage optimization application (hereinafter, "the App"). The App 140 can monitor data storage related activities of the computing device 104 and perform storage optimization methods based on a set of policies for the purpose of reducing the amount of data stored in the computing device. The set of policies includes one or more policies based on user access patterns and device classification.

Although the App 140 is illustrated in FIG. 1 (as well as described throughout the disclosure) as a separate entity from the computing device 104, it is noted that in some specific embodiments, both the computing device 104 and the App 140 can be implemented in the same computing device, such as a smart phone or a tablet computer. For example, the App 140 can be implemented by, or a part of, an operating system of the computing device 104, such that the standalone computing device can be the sole host of the environment 100 and practice the various techniques disclosed herein. In some embodiments, the App 140 can be implemented by, or a part of, the storage optimization server 110. In some embodiments, the various functionalities of the App 140 can be distributed between the computing device 104 and the storage optimization server 110. In particular, certain functionalities can run at the computing device while other functionalities can run at the storage optimization server 110 for the purpose of implementing the storage optimization technology.

The storage optimization server 110 (hereinafter, "server") can be one or more server computers or work stations that are employed by a storage optimization service for facilitating storage optimization in association with files being downloaded and/or stored by the computing device 104 from the content providers 130. The server 110 can execute the App 140 solely or in coordination with the computing device 104. The server 110 typically includes at least one processor and a memory, and may be further connected to one or more computers (not shown in FIG. 1 for simplicity) that manage storage optimization processes (e.g., downsampling, data compression, and the like) via the network 120. The server 110 is typically equipped with or is coupled to a storage device (e.g., storage device 308, discussed below in relation to FIG. 3) for storing storage optimization policies, access patterns of one or more users of one or more computing devices, and/or device classifications of the one or more computing devices.

Figure 2:
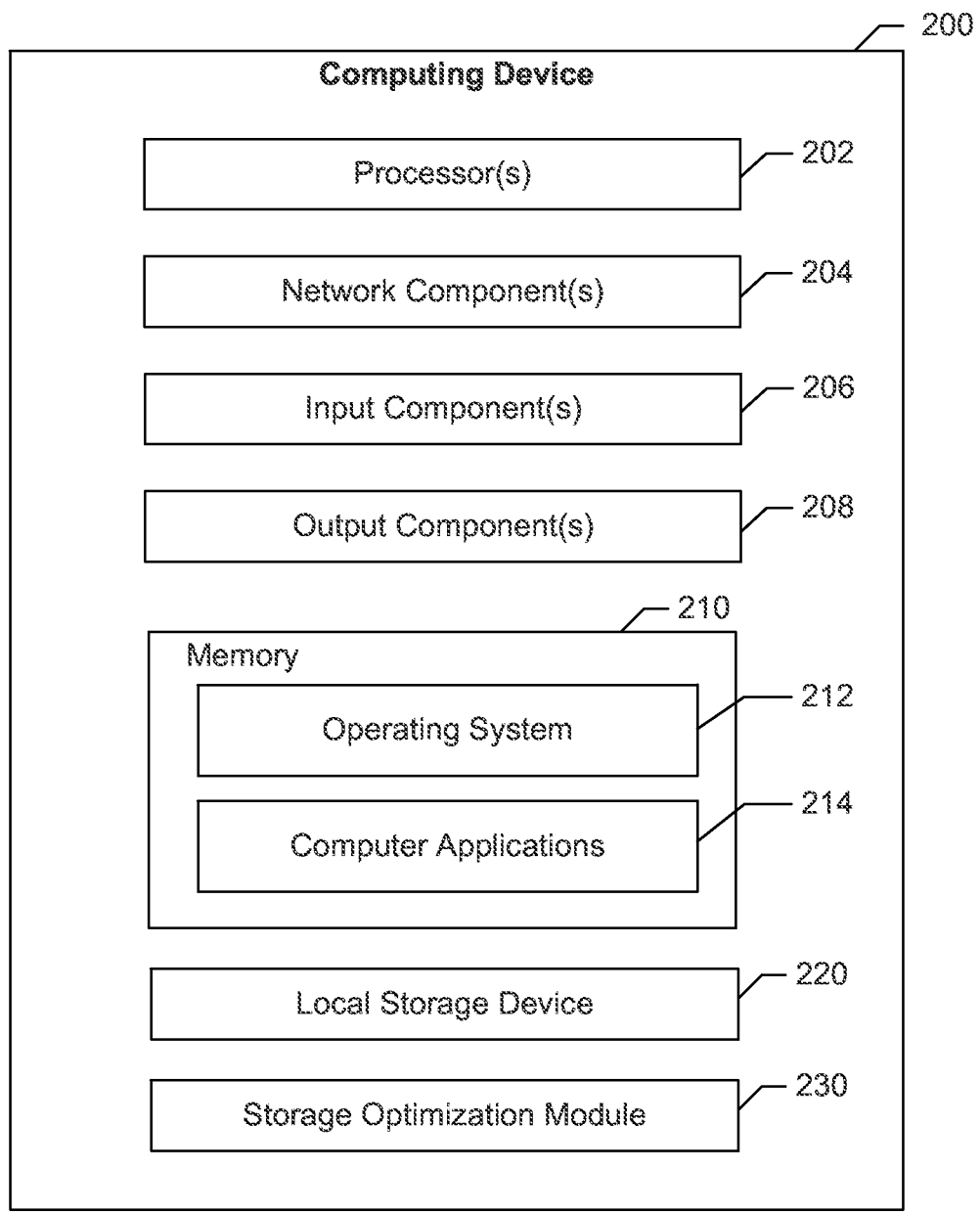
FIG. 2 illustrates components/modules of or associated with a computing device, in accordance with various embodiments.

FIG. 2 illustrates certain components (or modules) of a computing device 200, in accordance with various embodiments. In at least some embodiments, the computing device 200 can be the computing device 104 of the system environment 100 of FIG. 1. The computing device 200 can include at least one or more processors 202, one or more network components 204, and a memory 210. The computing device 200 can also include one or more input components 206 (e.g., a touch screen, a keyboard, a mouse, etc.), one or more output components 208 (e.g., a display, a printer, a speaker, etc.), a local storage device 220, and a storage optimization module 230.

The one or more processors 202 are configured to execute instructions of the computer applications 214 and the operating system 212 of the computing device 200. The memory 210 includes the operating system 212. The operating system 212 is a collection of software instructions that provide services for computer programs and other software modules, such as the storage optimization module 230, and manage computer hardware resources, such as the components 202, 204, 206, 208, and 220. One or more computer programs, such as computer applications 214, can run on the operating system 212 when executed by the one or more processors 202.

The network component 204 can be, for example, a Wi-Fi networking adapter, a cellular phone networking adapter, or a combination thereof. The network component 204 is configured for network communications with other devices, including the server 110 and the content providers 130, for example, for sending content requests and receiving content (e.g., multimedia files) from the content providers 130, or for receiving a downsampled or compressed version of the data files from the server 110 as part of a storage optimization process.

The local storage device 220 can store the instructions, the operating system 212, user data, such as data about access patterns of the user, data files of the user, and any other data necessary for the operation of the computing device 200 and execution of the computer applications 214. The local storage device 220 can include, for example, one or more hard drives (which may be further coupled together using RAID-0, 1, 5, 10, etc.). In some embodiments, the local storage device 220 can include a centralized or distributed data cluster, a cloud-storage service provider, or other suitable storage systems suitable for storing digital data.

The storage optimization module 230 can perform the various storage optimization functionalities of the App 140 of FIG. 1. The storage optimization module 230 is configured to manage and maintain a set of storage optimization policies (i.e., one or more policies) for the computing device 200. The storage optimization module 230 can assist the computing device 200 in reducing the amount of data of files that gets stored in the local storage device 220 by causing storage optimization methods to be executed based on the set of storage optimization policies. In some embodiments, the storage optimization methods can include various data compression methods, including lossy compression and lossless compression.

The storage optimization module 230 can provide the operating system 212 an indication of compressibility ("compressibility indication") of data associated with one or more files stored in the local storage device 220. The compressibility indication is generated by the storage optimization module 230 based on access patterns in association with the data. The compressibility indication can include whether or not a portion, or a whole, of the data is compressible. The operating system 212, in response to receiving such indication can proceed to compress the data. In some embodiments, the compressibility indication can include a recommendation of a particular data compression method to be implemented.

In one example, the storage optimization module 230 identifies that certain data components, of a gaming application stored on the computing device 200, have not been accessed by the user of the device 200, and performs a prediction that those data components have a low probability of being accessed in a near future. In some embodiments, the storage optimization module 230 can further determine that the data components may still be pertinent to the gaming application. In such embodiments, the storage optimization module 230 generates a compressibility indication to indicate that those data components are compressible, and that the optimal compression method is lossless compression to allow for reconstruction of the compressed data. In other embodiments, the storage optimization module 230 generates a compressibility indication that indicates only whether the data components are compressible based on the access pattern. The operating system 212, using such information, can determine whether lossy compression or lossless compression is appropriate for compressing the data components.

The storage optimization module 230 can be part of the memory 210. The storage optimization module can be executed by the one or more processors 202. The storage optimization module 230 can be part of a computer application 214. The storage optimization module 230 can also be part of the operating system 212. The storage optimization module 230 can run a background process on the operating system 212, accessible to any application running on the operating system 212.

For example, the storage optimization module 230 can perform in the background the monitoring of access patterns associated with data of various files stored in the local storage device. In response to determining that certain data have not been utilized or accessed by the computing device 200 (e.g., the user has not looked at a photo album for the last 10 months), the storage optimization module 230 can alert the operating system 212 (e.g., compressibility indication). In some embodiments, the storage optimization module 230 can work in coordination with another application running on the operating system 212 to cause compression of the certain data.

In embodiments, the storage optimization module 230 can run a service accessible within the operating system 212 and/or across a network (e.g., via the network components 204). For example, the storage optimization module 230 causes performance of downsampling working in coordination with the server 110 of FIG. 1.

The storage optimization module 230 facilitates the computing device 200 to perform the storage optimization functions, for example, including the receiving, from the server 110 of FIG. 1, downsampled and/or compressed versions of data files sent by the content providers 130 of FIG. 1, or the compressing of data files already stored in the local storage device 220, by use of one more components (or modules). Additional details with respect to the components/modules of the storage optimization module 310, and the corresponding functionalities of those components/modules, are described with reference to FIG. 4 below.

Figure 3:
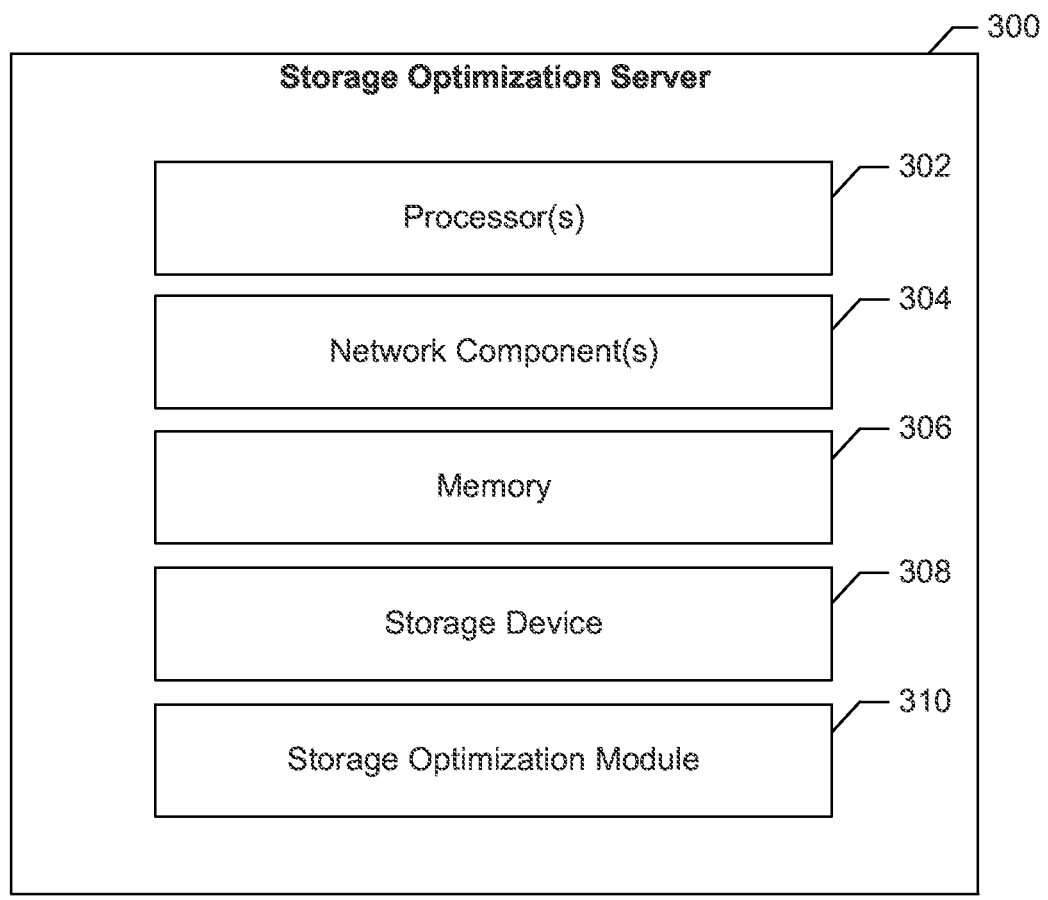
FIG. 3 illustrates components/modules of or associated with a server, in accordance with various embodiments.

FIG. 3 illustrates components (or modules) of or associated with a server 300, in accordance with various embodiments. In at least some embodiments, the server 300 can be the server 110 of FIG. 1. The server 300 can include one or more processors 302, one or more network components 304, a memory 306, a storage device 308, and a storage optimization module 310. The memory 306 can include instructions which when executed by the one or more processors 302 enables the server 300 to perform the functions, including storage optimization. The storage device 308 can include, for example, one or more hard drives, a centralized or distributed data cluster, a cloud-storage service provider, or other suitable storage systems suitable for storing digital data.

The one or more network components 304 is configured for network communications with other devices, including the computing device 104 and the one or more content providers 130 of FIG. 1. For example, the one or more network components 304 can be utilized for receiving data files from the content providers 130 (i.e., intercepting a transmission of data files) upon detecting a download request of the data files of the computing device 104, and for sending a downsampled and/or compressed version of the data files to the computing device 104 as part of a storage optimization process.

The storage optimization module 310 can facilitate the various storage optimization functions of the App 140 of FIG. 1. In the embodiment of FIG. 3, the storage optimization module 310 facilitates the server 300 to perform the storage optimization functions, including the intercepting/receiving and/or sending downsampled and/or compressed versions of data files from/to the computing device 104, as part of the storage optimization. Additional details with respect to the components/modules of the storage optimization module 310, and the corresponding functionalities of those components/modules, are described with reference to FIG. 4 below.

Figure 4:
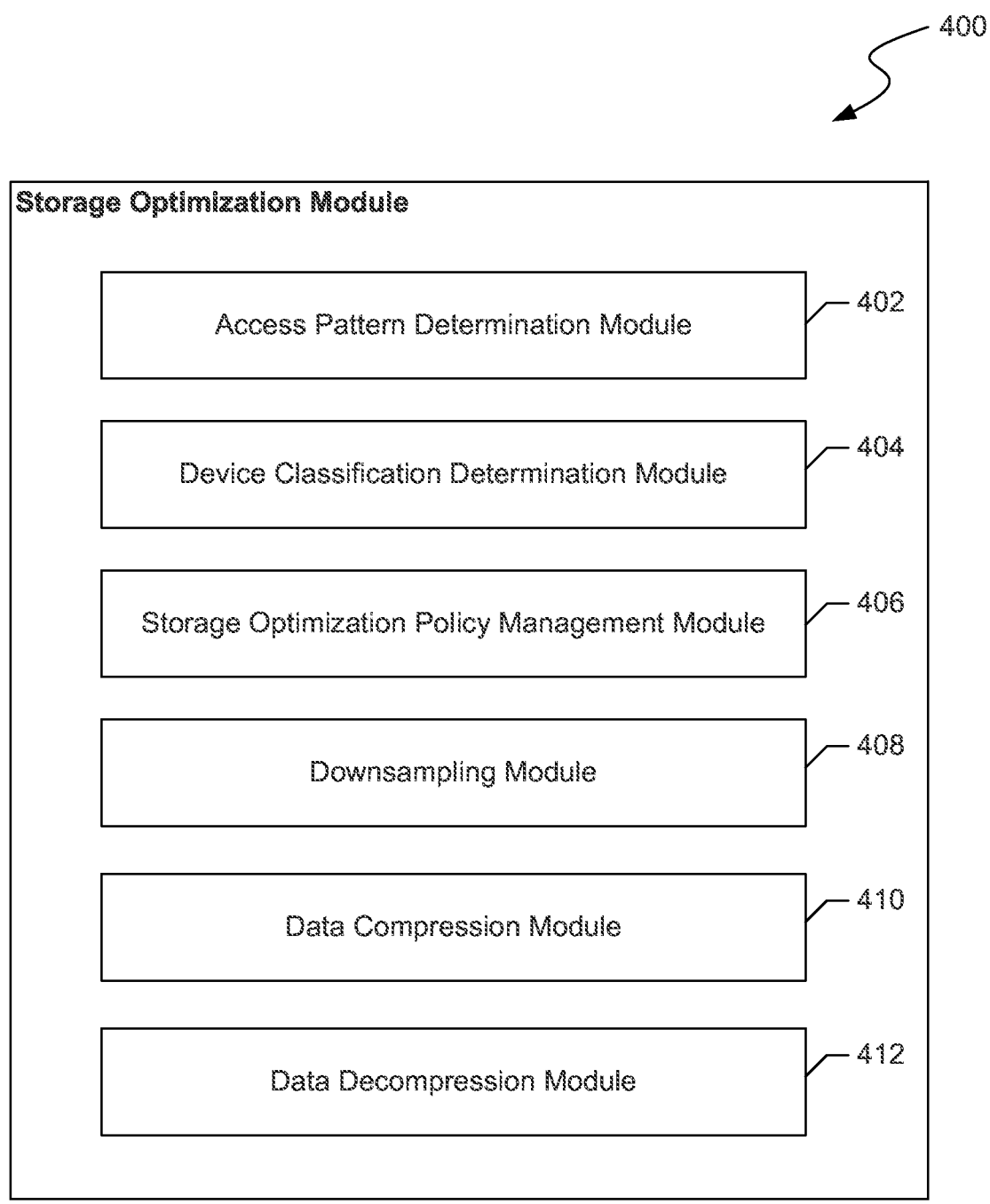
FIG. 4 illustrates components/modules of or associated with a data synchronization module 700, in accordance with various embodiments.

FIG. 4 illustrates components/modules of or associated with a storage optimization module 400, in accordance with various embodiments. The optimization module 400 can facilitate the various storage optimization functions of the App 140 of FIG. 1. In some embodiments, the storage optimization module 400 can be used to implement the storage optimization module 230 of the computing devices 200 of FIG. 1, or the storage optimization module 310 of the server 300. In some embodiments, the storage optimization module 230 can be used for reducing the amount of data of files being downloaded to a user device of a user and/or files already stored on the computing device based on storage optimization policies. The user device can be the computing device 104 of FIG. 1 or the computing device 200 of FIG. 2.

The storage optimization module 400 includes an access pattern determination module 402 to monitor the access of data files on the user device by the user, and to generate one or more access patterns based on various parameters. A storage optimization policy management module 406 can use the access patterns to define the storage optimization policies for identifying files that can be compressed and/or files that can be downsampled. The various parameters of a particular access pattern can include (a) a frequency of access of a particular data file, (b) a number of times the particular data file is requested or downloaded to the user device from another computing device (e.g., content provider 130 of FIG. 1), (c) a time period for which the particular data file is accessed using the user device, (d) a last access time of the particular data file, etc.

In some embodiments, the access pattern determination module 402 uses a particular access pattern to determine (a) a likelihood of a particular data file being accessed in the future and/or (b) a likelihood of the particular data file being accessed in its entirety in the future (i.e., the original data needs to be perfectly reconstructed, e.g., in the case of data compression). In some embodiments, where the access pattern determination module 402 resides on the user device, the access pattern determination module 402 can monitor the access of the data files on the user device and transmit the access pattern to the server 110 of FIG. 1. The server 110 can consolidate the access patterns received from the computing device for different sets of data files and perform a storage optimization function based on the access patterns. The access patterns can be stored, for example, in the storage device 220 of the computing device 200 or the storage device 308 of the server 300.

The storage optimization module 400 includes a device classification determination module 404 to identify a classification, or type, of the user device.

Synchronization requests from the computing devices can be categorized into a normal sync or a priority sync. In some embodiments, a normal sync downloads all of the user data files from the server 110 that have been added to or changed in the server 110 since the computing device was last synchronized. In some embodiments, a priority sync can download a selected subset of the data files, that is, priority files, rather than all of the data files to minimize the consumption of computing resources. The priority files can be selected based on various factors, e.g., access pattern of the data files.

A device classification (or device type) can be categorized into general categories or specific subcategories of a general category. For example, the device classification can be a mobile device (e.g., a laptop) or a non-mobile device (e.g., a desktop). The device classification can also be, for example, a smartphone, a computing tablet, a laptop, or a desktop. The storage optimization policy management module 406 can use the device classification to define the storage optimization policies for identifying files that can be compressed and/or files that can be downsampled. For example, if the user device is an IPHONE®, the storage optimization policy management module 406 can utilize such information to recommend downsampling the image resolution of a file from an IPAD® quality to an IPHONE® quality. As a result, the amount of data of the file is reduced when the file is downloaded, or stored, to the IPHONE®.

The storage optimization module 400 includes the storage optimization policy management module 406 to manage and to maintain a set of storage optimization policies for reducing the amount of data stored on the user device. The storage optimization policy management module 406 may provide a user interface to manage the storage optimization policies, for example, to customize existing storage optimization policies, to remove existing storage optimization policies, or to add new storage optimization policies. The storage optimization policies can be managed by the user of the computing device 104 and/or an administrator of the server 110 of FIG. 1.

In some embodiments, the storage optimization policy management module 406 generates the storage optimization policies based on various thresholds. The thresholds can be based on (a) the access patterns of files being downloaded and/or stored to the user device, (b) the device classification, and/or (c) other factors that may affect availability of the download or the storing of files to the user device. The thresholds can be a percentage scale or a time period. For example, a policy can include that a data file should be downsampled if the file has not been accessed in the last month. In another example, a policy can include that a data file should be compressed if the 80% of the file has not been accessed in the last week. The thresholds can be configured by the user of the computing device 104 and/or an administrator of the server 110 of FIG. 1.

In some embodiments, the storage optimization policy management module 406 can provide an indication of whether downsampling is appropriate for a data file being downloaded to the user device ("downsampling indication"). The downsampling indication is generated by the storage optimization policy management module 406 based on the access pattern of the data file and based on the device classification. A downsampling module 408, in response to receiving such indication, can proceed to downsample the data file.

In some embodiments, the storage optimization policy management module 406 can provide an indication of compressibility ("compressibility indication") of data associated with one or more files stored on the user device. The compressibility indication is generated by the storage optimization policy management module 406 based on access patterns in association with the data. The compressibility indication can include whether or not a portion, or a whole, of the data is compressible. A data compression module 410, in response to receiving such indication, can proceed to compress the data. In some embodiments, the compressibility indication can include a recommendation of a particular data compression method to be implemented (e.g., lossy compression or lossless compression).

In some embodiments, the storage optimization policy management module 406 can provide a recommendation of perform data compression on a downsampled file. For example, at the download of a music file, the file is downsampled, and then further compressed for storage in the user device. Such example may occur if space is limited on the storage device of the user device, and the user is performing the download for later usage (e.g., to send via e-mail to another user).

In some embodiments, the storage optimization policy management module 406 monitors data storage related activities of the user device, and generates the downsampling indication and/or compressibility indication based on the activities. The data storage related activities can include an activity triggering a download of content (e.g., viewing a webpage, streaming a video, accessing music from a cloud service, etc.), or an activity triggering storage management (e.g., increase of storage usage in the current month as compared to the previous month, recent installations of new application(s), etc.)

In one example, when the user accesses a PINTEREST® webpage using the user device, the web browser application running on the device sends a request for content, such as image files, from a server hosting the PINTEREST® webpage (e.g., website hosted by a content provider 130 of FIG. 1), where the request results in certain data of the content getting cached, or downloaded, to a local storage device. In such example, the storage optimization policy management module 406 can detect the request activity (i.e., initiation of download) based on its monitoring of the device. In response to such detection, the storage optimization policy management module 406 communicates with the access pattern determination module 402 and the device classification determination module 404. The access pattern determination module 402 provides the access pattern associated with the content requested and the classification determination module 404 provides the device classification.

Based on the access pattern and the device classification, the storage optimization policy management module 406 selects one or more storage optimization methods based on the set of storage optimization policies, and generates the appropriate one or more indications including the method(s). The indications can include, for example, whether the image files can (and/or should) be downsampled before being downloaded to the device, and whether image files can (and/or should) be compressed. In some embodiments, the indications include whether lossy compression or lossless compression should be performed.

The storage optimization module 400 includes a downsampling module 408 to perform functions associated with downsampling of one or more data files being downloaded by the user device. The downsampling module 408 can be utilized to downsample a particular file that is specified by the storage optimization policy management module 406 to be downsampled, based on a storage optimization policy. For example, the downsampling module 408 generates a downgraded format of the particular file for transmitting to the user device.

The storage optimization module 400 includes a data compression module 410 to perform functions associated with data compression of one or more data files being downloaded by the user device. As discussed above, two types of data compression can occur: lossy compression and lossless compression. The data compression module 410 can be utilized to compress a particular file that is specified by the storage optimization policy management module 406 to be compressible, based on a storage optimization policy. The storage optimization policy can specify which compression method (e.g., lossy compression and lossless compression) is optimal for compressing the data based on the user access patterns. For example, where a particular storage optimization policy specifies that lossless compression is optimal where 90% of the data files of a particular application is in usage and/or there is uncertainty whether the 10% is needed by the particular application, a lossless compression of the 10% is recommended. In such example, the access pattern determination module 402 generates a prediction that, based on the access pattern of the user in relation to the 10% of the data, that 10% of the application will not likely be used in the near future. As such, the lossless compression will enable saving of current storage space while still providing a chance to decompress the data for use at some point in time.

In some embodiments, the data compression module 410, working in coordination with the storage optimization policy management module 406, to determine and generate the compressibility indication. In such embodiments, the data compression module 410 communicates to the user device's operating system which data of one or more files stored in a local storage of the device are compressible based on the access patterns. In some embodiments, the data compression module 410 can determine and generate an indication whether a lossy compression method or a lossless compression method is optimal for compressing the data based on the access patterns. Accordingly, the total amount of data stored on the device is continuously reduced without affecting a user's access to the files.

In some embodiments, the storage optimization module 400 includes an decompression module 412 to perform functionalities associated with decompression of the compressed data of one or more files. In such embodiments, the decompression module 412 may reside on the user device for decompressing data files received from another computing device (e.g., content provider 130 of FIG. 1, server 110 of FIG. 1, etc.). In other embodiments, the decompression module 412 is a standalone module separate from the storage optimization module 400. In such embodiments, the decompression module 412 may reside, for example, on the user device to assist the user in reconstructing information from compressed files.

In some embodiments, some of the components (or modules) of the storage optimization module 400 discussed above may reside on the computing device 104, while other components (or modules) reside on the storage optimization server 110 of FIG. 1. In such embodiments, the combined components/modules, of the computing device 104 and the server 110, work in coordination as one storage optimization mechanism. In some embodiments, a majority of the components/modules of the storage optimization module 230 may reside in the computing device 104, and can work in coordination with a few of the components/modules residing on the storage optimization server 110. For example, all of the modules, except for the downsampling module 408, reside on the computing device 104. In another example, all of the modules, except for the storage optimization policy management module 406, reside on the computing device 104.

In some embodiments, the majority of the components/modules of the storage optimization module 230 may reside, instead, on the storage optimization server 110 of FIG. 1. In such embodiments, consider an example where a user is viewing a web gallery of photos using a web browser running on the user's smartphone. The web browser sends a request to access the photos from a server hosting the web gallery (e.g., content provider 130 of FIG. 1). The web browser's request is detected by the storage optimization module 400 that has a majority of its components/modules residing on the server 110. For instance, it can be the storage optimization policy management module 406, which resides on the server 110, that detects the web browser's request (i.e., a data storage related activity).

In such instance, in response to the detection, the storage optimization policy management module 406 decides the appropriate storage optimization method based on the access pattern in association with the photos being requested by the web browser and based on the device classification. The storage optimization policy management module 406 communicates with the access pattern determination module 402 and the device classification determination module 404, both of which reside on the server 110, to obtain the access pattern and the device classification. The access pattern indicates, for example, that there is a low likelihood the user will look at the photos again as the user frequently visits a variety of different web galleries on a daily basis because (i.e., a mere browsing experience). Further, the device classification indicates that the user is using a smartphone device, and as such, a lower resolution of the photos will not affect the user's viewing experience (i.e., full resolution is unnecessary). Based on this information, the module 406 determines that downsampling is the optimal storage optimization method.

In another instance, it can be the access pattern determination module 402, which resides on the server 110, that detects the request, for example, as part of the monitoring process that the module 402 regularly performs. The access pattern determination module 402 can alert the storage optimization policy management module 406, which resides on the server 110, of the occurrence of the browser's request (i.e., a data storage related activity). The storage optimization policy management module 406 can request the device classification information from the device classification determination module 404, which also resides on the server 110, and determines that downsampling is the optimal storage optimization method.

In response to the determination that downsampling is appropriate, the storage optimization policy management module 406 can cause the server 110 (e.g., communicate with the operating system of the server) to intercept the content transmitted from the web gallery to the smartphone, and downsample the content. The downsampling can be done, for example, by the downsampling module 408 residing on the server 110. The storage optimization policy management module 406 may, at this step, also cause the server 110 to compress the downsampled (i.e., downgraded) content, based on a storage optimization policy (e.g., compress when access pattern indicates unlikelihood of usage in a near future). This can be performed, for example, by the data compression module 410 residing on the server 110. The server 110 then forwards (e.g., via a network component) the smartphone resolution images to the user's device. As a result, a smaller amount of data gets downloaded, or stored, to the device.

Data compression method can also be performed by components/modules residing on the server 110. The access pattern determination module 402, for example, can be working in coordination with one or more network components of the server 110 to monitor, over a network, the user's access of content stored on the user's device. The access pattern determination module 402 can work with the storage optimization policy management module 406 to determine when data compression (and type of data compression) is appropriate, the storage optimization policy management module 406 can work in coordination with one or more network components of the server 110 to communicate with the user's device, and cause the device to perform data compression (e.g., communicate with operating system of the device). The device may utilize a data compression module 410 that resides on the device to communicate with the storage optimization policy management module 406 and perform data compression on the identified set of data files.

With respect to FIGS. 2-4, it is noted that the one or more modules/components described can be implemented as instructions on a tangible storage memory capable of being executed by a processor or a controller. The tangible storage memory may be volatile or non-volatile memory. In some embodiments, the volatile memory may be considered "non-transitory" in the sense that it is not a transitory signal. Modules may be operable when executed by a processor or other computing device (e.g., a single-chip board, application specific integrated circuit, a field-programmable gate array (FPGA), a network capable computing device, a virtual machine, a cloud-based computing device, or any combination thereof). Memory spaces and storages accessible to the modules can be implemented with tangible storage memory as well, including volatile or non-volatile memory.

Each of the modules/components may operate individually and independently of other modules or components. Some or all of the modules may be executed by different computing components. The separate computing components can be coupled through one or more communication channels (e.g., wireless or wired channels) to coordinate their operations. Some or all of the modules may reside on different memory devices. Some or all of the components and/or modules may be combined as one component or module.

A single module/component may be divided into sub-modules, each sub-module performing a separate method step or method steps of the single module/component. In some embodiments, at least some of the modules share access to a memory space. For example, one module may access data accessed by or transformed by another module. The modules/components may be considered "coupled" to one another if they share a physical connection or a virtual connection, directly or indirectly, allowing data accessed or modified from one module to be accessed in another module.

Figure 5:
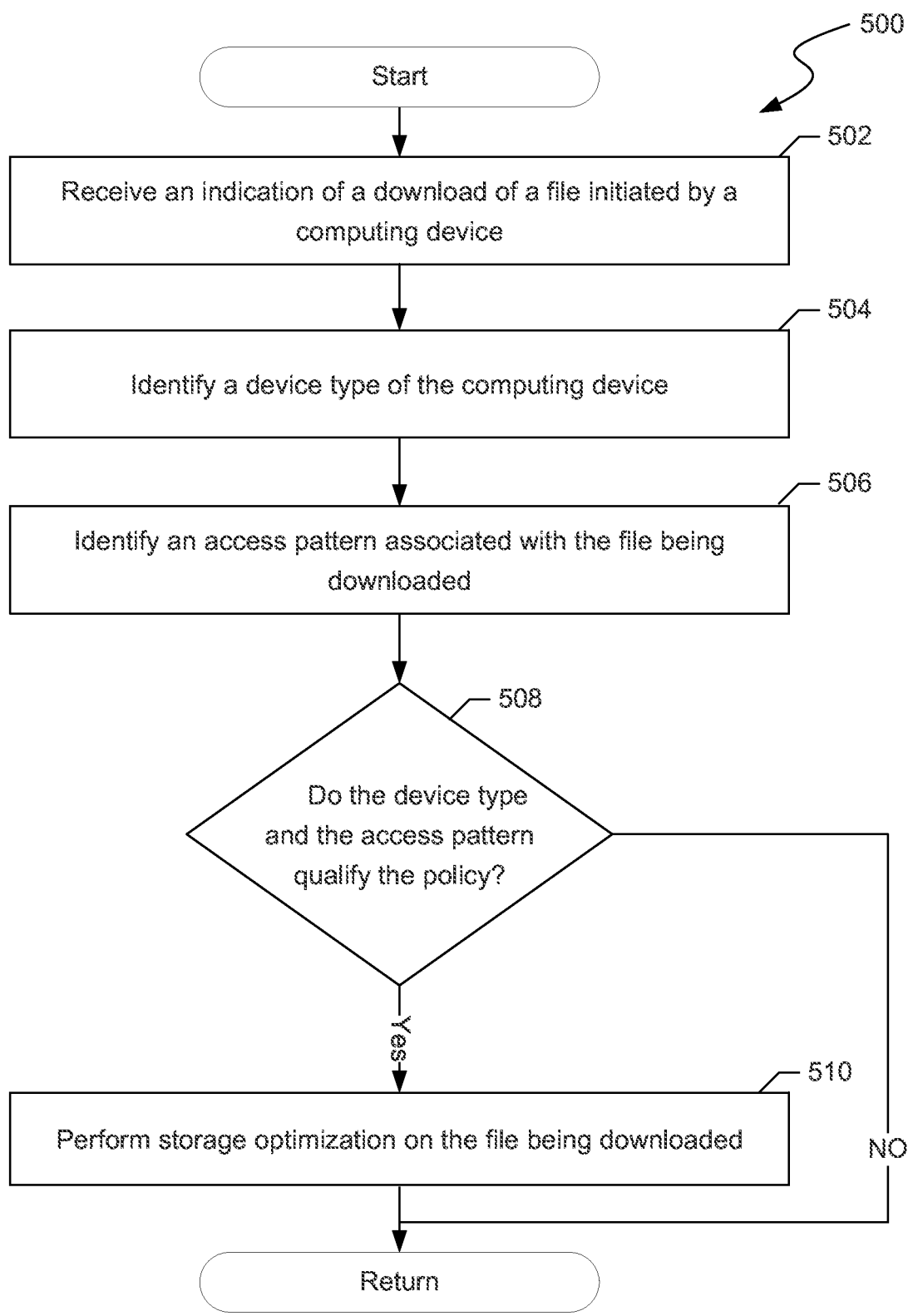
FIG. 5 illustrates a process of performing storage optimization of a file being downloaded to a computing device, in accordance with various embodiments.

FIG. 5 illustrates a process 500 of performing storage optimization of a file being downloaded to a computing device, in accordance with various embodiments. In some embodiments, the process 500 may be implemented by the App 140 in the environment 100 of FIG. 1, and using a storage optimization module 400 of FIG. 4. According to the embodiment of FIG. 5, a majority of the modules/components of the storage optimization module 400 reside on a server 110 configured to optimize storage capacity of one or more computing devices, such as computing device 104 of the user 102. Further, in the embodiment, one or more data files are stored in the server system of the content providers 130 of FIG. 1 (e.g., a web hosting system, a cloud service system, etc.).

At step 502, the network component 304 of the server 110 receives an indication that a download request of one or more files, form a content provider, has been initiated by an application executing on an operating system of a computing device of a user (e.g., device 104). The content provider can be a cloud storage server. For example, the cloud storage server provides storage of music files, and the application running on the device is a music player application. In another example, the application running on the device is a gaming computer application connecting with a web game server (i.e., content provider). According to the embodiment, the computing device of the user is a device which the user typically accesses her data files. The computing device can be mobile device, such as a smartphone, a tablet PC, a game console, a laptop, etc.

At step 504, the device classification determination module 404 determines what type of device is the computing device. The device type can be specified as a general category, such as a mobile device, or a specific category, such as a smartphone. At step 506, the access pattern determination module 402 determines an access pattern associated with the one or more files to be received from the content provider (e.g., to be downloaded into cache). For example, where the files are images of a user's web gallery, the module 402 determines the user's usage in relation to the images in that gallery. The module 402 determines that there is a low likelihood that images from a Christmas album (e.g., from three months ago) will likely be viewed, as in the last few access times, the user has viewed only images from albums created in the last three weeks.

At decision block 508, the storage optimization policy management module 406 determines, or selects, the storage optimization method to be applied based on the access pattern and the device classification, according to a set of storage optimization policies. For example, a particular storage optimization policy may consider a download request for a data set (e.g., photo albums of a web gallery) that include data which have not been accessed more than three months as a request for only relevant data. Under such policy, the images from the Christmas album in the example above should not be downloaded. In such example, the storage optimization policy management module 406 can generate an indication recommending those images not to be downloaded. The indication can be utilized, for example, by the server 110, in intercepting the user's download request to the content provider, and sending a message that only data associated with images for that last three weeks should be transmitted.

In another example, a particular storage optimization policy may consider a download request for data that is infrequently used based on access pattern from the last three months as a request for downsampling. Under such policy, for a user requesting a local storage synchronization of his music library from a cloud service, for example, the storage optimization policy management module 406 will recommend downsampling. In particular, the storage optimization policy management module 406 can generate an indication recommending downsampling songs that are infrequently listened by the user (based on access pattern). In such example, high-quality versions of the songs often accessed by the user are downloaded while the low-quality versions (i.e., downgraded format) of the songs that are infrequently listened to by the user are downloaded. Accordingly, using the various storage optimization policy, the server 110 intelligently decides downsampling of only certain data (or files) in a particular download request based on access patterns.

In another example, where the download request includes a game application, a particular storage optimization policy may decide the optimal storage optimization method based on the access pattern of a number of game levels completed by the user. For example, where the user has accessed the game to complete levels 1 through 3, the likelihood that the user will need to access data associated with those levels is low. In such example, the policy can recommend a download of a minimum necessary version (e.g., data exclusive to levels 1-3 and not required for the remaining levels of the game should not be downloaded, only a low-resolution version (i.e., downgraded format) of the image files for levels 1-3 should be downloaded, etc.).

At step 510, an operating system, working in coordination with a processor of the server 110, performs one or more storage optimization methods based on the indication received from the storage optimization policy management module 406. The storage optimization method can include downgrading the data file, i.e., converting the data file into a downgraded format. The downgraded format can include, for example, a reduced file size, a reduced image size, a thumbnail, or a lower resolution version of a copy of an image file stored on the content provider server system 130. For example, downsampling may be performed on a portion or all of the data of the download request. In the above example, low quality versions of the "infrequent" music files are downloaded to the device, as opposed to the high quality versions. In another example, a removal of a portion of data of the download request is performed (e.g., not even thumbnails of the Christmas album images are downloaded). In some embodiments, data compression may also be performed in addition to downsampling.

Figure 6:
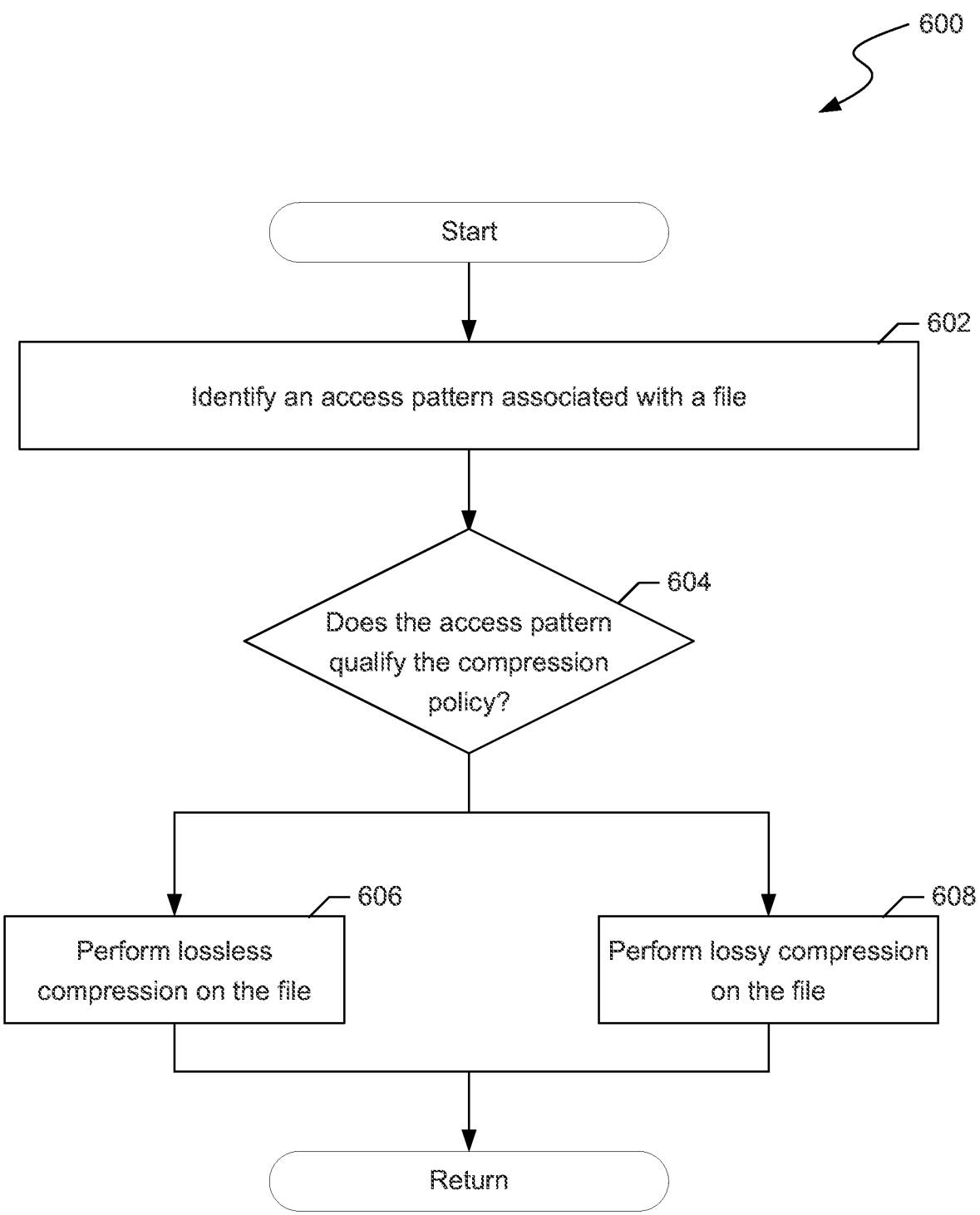
FIG. 6 illustrates a process of performing storage optimization of a file stored on a computing device, in accordance with various embodiments.

FIG. 6 illustrates a process 600 of performing storage optimization of a file stored on a computing device (e.g., device 104 of FIG. 1), in accordance with various embodiments. In some embodiments, the process 600 may be implemented by the App 140 in the environment 100 of FIG. 1, and using a storage optimization module 400 of FIG. 4. According to the embodiment of FIG. 6, the App 140 resides on the computing device, where a majority of the modules/components of the storage optimization module 400 are residing on the computing device, such as. Further, in the embodiment, one or more data files are stored in a storage device of the computing device, such as local storage device 220 of FIG. 2. The process 600 can be a background process that runs on the computing device to compress data on a continuous basis to reduce the amount of data stored on device and improve storage capacity.

At step 602, the access pattern determination module 402 determines an access pattern associated with the one or more files stored on the computing device. For example, for an existing gaming application stored on the device, the module 402 determines which data portions, or components, of the gaming application are still relevant based on the user's access of the gaming application. The module 402 can determine that there is a low likelihood that graphic images for level 1, which has already been completed by the user, will likely be accessed by the user.

At step 604, the storage optimization policy management module 406 determines the storage optimization method to be applied based on the access pattern, according to a set of storage optimization policies. For the gaming application example, a particular storage optimization policy may consider the graphic images to be irrelevant, but that the remaining data set of the application is still relevant to the user, based on the access pattern. In such example, the storage optimization policy management module 406 can generate a compressibility indication for the graphic images.

In particular, the compressibility indication can include that lossless compression is appropriate for compressing the graphic images based on the access pattern (e.g., the user may want to revisit level 1). At step 606, the computing device performs lossless compression. This can be executed, for example, by the operating system 212 working in coordination with the processors 202. Lossless compression will allow the computing device to save storage space, yet still reconstruct the data (e.g., using decompression module 412).

In another example, where reconstruction of the data is unnecessary, lossy compression may be performed, as indicated in step 608.

FIG. 7 is a block diagram of a computer system as may be used to implement features of some embodiments of the disclosed technology. The computing system 700 may include one or more central processing units ("processors") 705, memory 710, input/output devices 725 (e.g., keyboard and pointing devices, display devices), storage devices 720 (e.g., disk drives), and network adapters Error! Reference source not found 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

What is claimed:

1. An apparatus for optimizing storage capacity of a computing device of a user, the apparatus comprising:
   a memory; and
   at least one processor coupled to the memory and configured to:
   determine a plurality of user access patterns for a plurality of different respective sets of data files previously accessed on a local storage of the computing device by a user of the computing device;
   receive, from the computing device, an indication of a request to download another set of multiple data files from a content provider server;
   determine, from the plurality of user acess patterns and for the other set of multiple data files to be downloaded from the content provider, a particular user access pattern associated with the other set of multiple data files based on a corresponding one of the respective sets of data files;
   receive, from the content provider server, the other set of multiple data files requested to be downloaded to the computing device in a first format;
   perform, based at least on the particular user access pattern determined for the other set of multiple data files, a downsampling of a subset of the other set of multiple data files received from the content provider server, leaving a remaining subset of the other set of multiple data files in the first format;
   compress the downsampled subset of the other set of multiple data files with a particular compression type, wherein the particular compression type is determined based at least on the particular user access pattern;
   transmit, to the computing device, the downsampled and compressed subset of the other set of multiple data files in downsampled and compressed format; and
   transmit, to the computing device, the remaining subset of the other set of multiple data files in the first format.

2. The apparatus of claim 1, wherein the particular compression type is one of a lossy compression or a lossless compression.

3. The apparatus of claim 1, the at least one processor further configured to:
   determine a device classification for the computing device; and
   perform the downsampling based in part on the device classification, wherein the device classification comprises any of a smartphone, a computing tablet, a laptop, or a desktop.

4. The apparatus of claim 1, wherein the particular user access pattern comprises a usage, by a user, of data files of the corresponding respective set of data files associated with the other set of multiple data files and stored in a local storage of the computing device.

5. The apparatus of claim 1, the at least one processor further configured to determine a device classification for the computing device, wherein:
   the device classification is a smartphone type; and
   to perform the downsampling, the at least one processor is configured to convert the subset of the other set of multiple data files to a file format that corresponds to the device classification.

6. The apparatus of claim 1, wherein respective data files in the downsampled subset of the other set of multiple data files are downsampled to include at least one of:
   a reduced file size;
   a reduced image size;
   a thumbnail; or
   a lower resolution version of a copy of the respective data file.

7. The apparatus of claim 1, wherein the indication of the request includes a user action comprising at least one of:
   accessing a website via a web browser application running on the user device;
   accessing a multimedia game via a mobile application running on the user device; or
   accessing a photo album.

8. The apparatus of claim 1, where the other set of multiple data files is stored at a content provider server.

9. A server system comprising:
   a network component configured to receive a request for downloading multiple data files of a user from a content provider server to a computing device of the user;
   an access pattern determination module configured to determine user access patterns for a plurality of different respective sets of data files previously accessed on the computing device, and identify, from the user access patterns, a particular user access pattern to use for the multiple data files based on a corresponding one of the respective sets of data files;

a downsampling module configured to receive the multiple data files from the content provider server in a first format, and downsample a subset of the multiple data files based on the particular user access pattern determined for the multiple data files, leaving a remaining subset of remaining multiple data files in the first format based on the particular user access pattern; and a data compression module configured to compress the downsampled subset of the multiple data files with a particular compression type based on the particular user access pattern, wherein the particular compression type is determined based at least on the particular user access pattern, wherein the network component is further configured to transmit, to the computing device, based on the particular user access pattern, the downsampled and compress subset of the multiple data files in downsampled and compressed format, and, based on the particular user access pattern, transmit the remaining set of the multiple data files in the first format.

10. The server system of claim 9, wherein a downsampled data file is at least one of:
a reduced file size;
a reduced image size;
a thumbnail; or
a lower resolution version of a copy of a corresponding original data file.

11. The server system of claim 9, wherein the particular user access pattern comprises data associated with a frequency of access on a local storage of the computing device of a particular data file associated with the multiple data files.

12. The server system of claim 9, further comprising a device classification module configured to identify a device type of the computing device, wherein the device type comprises any of a smartphone, a computing table, a laptop, or a desktop.

13. An apparatus comprising:
a memory; and
at least one processor coupled to the memory and configured to:
determine a user access pattern associated with a first set of data files having been accessed on a local storage of a computing device by a user of the computing device;
receive, from the computing device, an indication of a request to download a second set of multiple data files from a content provider server;
determine a storage optimization policy to be applied to the second set of multiple data files based on the user access pattern;
receive the second set of multiple data files form the content provider in a first format;
perform, based at least on the user access pattern, a data compression on a subset of the second set of multiple data files, leaving a remaining subset of the second set of multiple data files in the first format;
sending, to the computing device, based at least on the user access pattern, the subset of the multiple data files in compressed format; and
sending, to the computing device, based at least on the user access pattern, the remaining set of the multiple data files in the first format.

14. The apparatus in claim 13, wherein the user access pattern comprises data associated with a frequency of access of the first set of data files stored on the local storage of the computing device.

15. The apparatus of claim 13, wherein:
the subset of the multiple data files is compressed using a particular compression type based at least on the user access pattern; and
the particular compression type is one of: a lossy compression or a lossless compression.

16. The apparatus of claim 13, wherein the first set of data files are stored on the local storage device of the computing device.

17. The apparatus of claim 13, wherein the user access pattern associated with the first set of data files indicates a likelihood of usage of data files of the second set of multiple data files.

18. The apparatus of claim 13, wherein:
the storage optimization policy comprises multiple thresholds associated with the user access pattern; and
the data compression is performed based on the user access pattern exceeding a particular one of the multiple thresholds.

19. The server system of claim 9, wherein the particular compression type is one of a lossy compression or a lossless compression.

* * * * *